(12) United States Patent
Reboh et al.

(10) Patent No.: US 7,104,179 B2
(45) Date of Patent: Sep. 12, 2006

(54) BRAKING DEVICE, AND METHOD OF MANUFACTURE

(75) Inventors: Jacques Reboh, Les Pavillons sous Bois (FR); Gwenaël Samson, Paris (FR)

(73) Assignee: Robert Bosch GmbH, Stuttgart (DE)

( * ) Notice: Subject to any disclaimer, the term of this patent is extended or adjusted under 35 U.S.C. 154(b) by 5 days.

(21) Appl. No.: 11/134,905

(22) Filed: May 23, 2005

(65) Prior Publication Data

US 2005/0262839 A1 Dec. 1, 2005

(30) Foreign Application Priority Data

May 27, 2004 (FR) .................................. 04 05756

(51) Int. Cl.
*F15B 9/10* (2006.01)
*B60T 13/00* (2006.01)
(52) U.S. Cl. .................................. 91/376 R; 60/547.1
(58) Field of Classification Search ............... 60/547.1; 91/376 R; 92/128
See application file for complete search history.

(56) References Cited

U.S. PATENT DOCUMENTS 4,450,688 A * 5/1984 Boehm ...................... 60/547.1

* cited by examiner

*Primary Examiner*—Edward K. Look
*Assistant Examiner*—Michael Leslie
(74) *Attorney, Agent, or Firm*—Leo H McCormick; Sarah Taylor

(57) ABSTRACT

A braking device and a method of manufacture of such a braking device. The braking device has a booster (1) formed of a cover (12) and of a cylinder (10). A central orifice (8) is formed on the cylinder. A master cylinder (5) has a body (14) that partially enters the booster via the central orifice. The master cylinder is fixed to the cylinder of the booster by plastic deformation of a hollow shaft (9). The hollow shaft borders the central orifice and extends towards the outside of the envelope and penetrates at least one orifice made in an exterior surface of the body of the master cylinder. The cylinder has a flat face that surrounds the central orifice such that a flange (6) extends radially towards the outside of the body of the master cylinder and bears more or less flat against the flat face of the cylinder.

7 Claims, 3 Drawing Sheets

BRAKING DEVICE, AND METHOD OF MANUFACTURE

Figure 1:
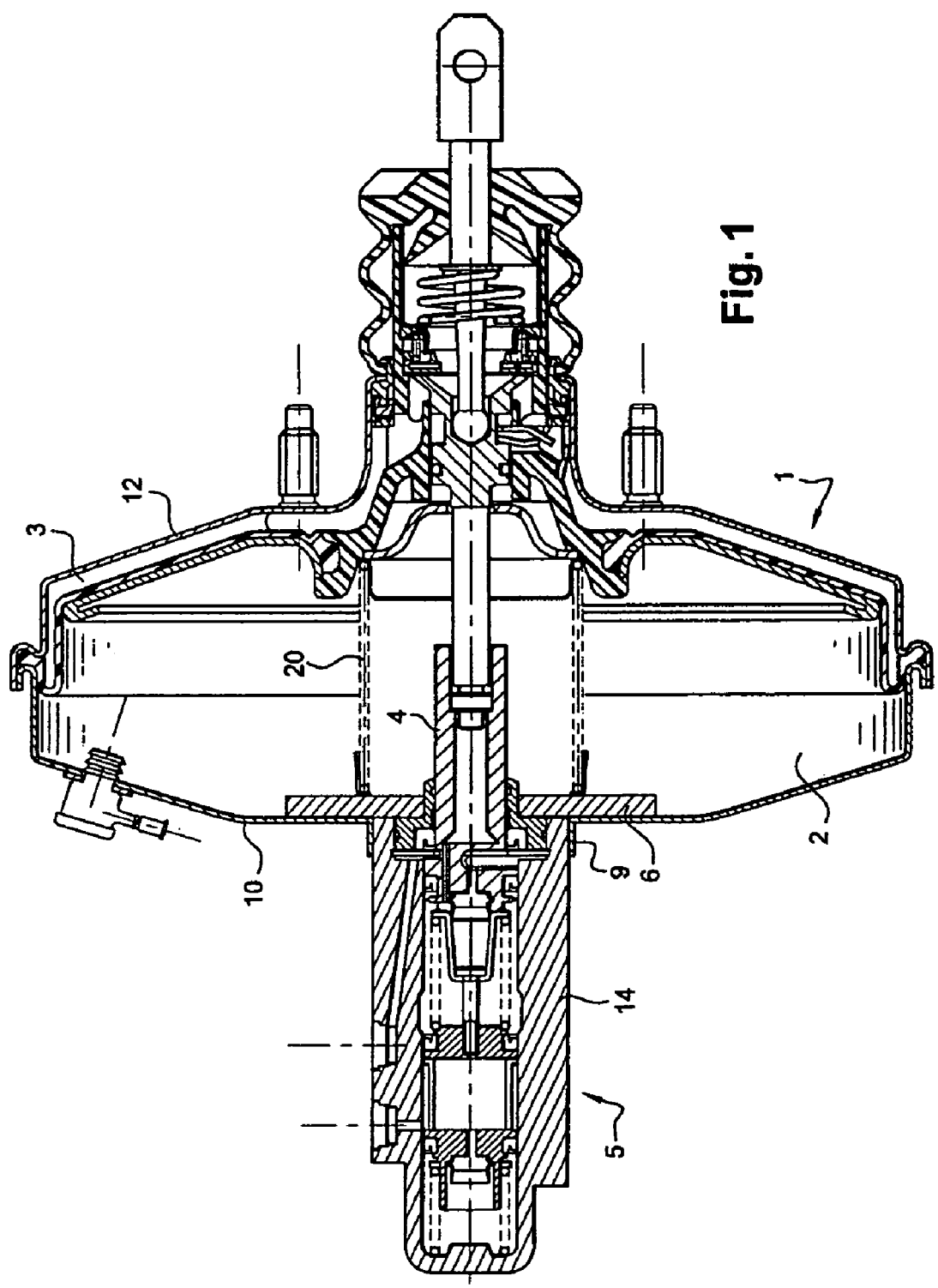

The present invention relates to a pneumatic brake booster for a motor vehicle. It is aimed at the mounting of a master cylinder on a booster casing and of a method of manufacturing such an assembly. More specifically, it is aimed at a system for fixing the master cylinder to the casing.

The object of the invention is to secure the master cylinder and the casing together effectively. Another object of the invention is to distribute over a large area the stresses which are exerted in the region of attachment of the master cylinder to the casing. An additional object of the invention is to reduce the number of parts needed for manufacturing such an assembly, and the time taken to manufacture a booster, and the cost price of a pneumatic booster. Another object of the invention is to propose a method of manufacturing such a booster.

BACKGROUND OF THE INVENTION

A pneumatic brake booster for a motor vehicle generally comprises a casing with a wall made of sheet metal. The casing comprises a variable-volume front chamber, separated from a rear chamber, also of variable volume, by a partition. The partition is formed of a sealed and flexible diaphragm and a rigid skirt plate. A master cylinder partially penetrates the front chamber of the casing, by means of a penetration snout. The front chamber, placed on the master cylinder side, is pneumatically connected to a source of vacuum. The rear chamber, on the opposite side to the front chamber and situated on the brake pedal side, is connected pneumatically, in a way controlled by a valve, to a source of driving fluid.

At rest, that is to say when a driver is not depressing the brake pedal, the front and rear chambers are connected to one another. The rear chamber is isolated from atmospheric pressure. Under braking, the front chamber is first of all isolated from the rear chamber, then air is let into the rear chamber. This admission of air has the effect of driving the partition forwards. The rigid skirt then drives a pneumatic piston of the booster which itself drives a primary piston of the master cylinder via a push rod. A pulling-out force that may exceed 4000 Newtons is then exerted on the master cylinder. It is absolutely essential for the master cylinder to be secured to the casing of the booster in order to prevent any movement of the master cylinder with respect to the casing.

The casing has the overall shape of a cylinder. It is closed at its two ends by a cover and a back wall respectively. The back wall of the casing is not flat. It is domed. Initially, booster casings were manufactured with a back wall of flat circular overall shape. It was then found that if the flat internal face of the back wall of the casing had the overall shape of a diamond, the metal sheet of the cylinder of the casing was better able to withstand the deformations due to the forces involved during braking. Since then, use has therefore been made of a cylinder having a diamond-shaped flat face. An inclined face extends from the edge of the flat face towards a cylindrical edge of the casing.

Generally, the master cylinder is fixed to the casing via a flange of the master cylinder. The flange, which extends at right angles to a master cylinder body, is pressed against the external face of the cylinder of the casing. The connection between the flange and the cylinder of the casing is achieved using a set of fixing screws. At least one screw, and generally two, passes through the cylinder and the master cylinder flange. A screw head is situated inside the casing. The screw is held in position by a nut.

Usually, a screw reinforcement stiffens the attachment region. The reinforcement is interpolated between the screw head and the flat face of the cylinder of the casing. The reinforcement has a screw orifice. This reinforcement advantageously has a flat face in contact with the flat face of the cylinder of the casing, and an inclined face in contact with the inclined face of the cylinder. It is therefore preferable for the inclined face of the reinforcement to have a slope equal to the slope of the inclined face of the wall. This then provides contact between the reinforcement and the internal faces, flat and inclined respectively, of the cylinder.

If the placement of the reinforcement is automated, the placement machine needs to be set up very precisely. Likewise, if placement is performed by hand, the operator needs to pay special attention. This is because the reinforcement needs to be positioned at a location that allows it to reinforce precisely that region of the sheet metal cylinder that is most heavily stressed under working conditions. The slightest offset of the reinforcement with respect to the internal face of the cylinder means that the slopes of the reinforcement no longer coincide with those of the cylinder. The regions subjected to the pulling-out forces are therefore not correctly reinforced. The sheet metal of the cylinder of the casing will experience excessive work under braking, and will weaken. This weakening leads to yielding of the sheet metal at the location of the fixing region, and to the master cylinder becoming detached.

Once the reinforcement has been correctly located, the screw is introduced into the screw orifice. The screw is tightened using a nut. This tightening step also requires great attention, in order to avoid any rotation of the reinforcement which could lead to incorrect positioning of the said reinforcement.

The current system for attaching the master cylinder to the booster therefore requires great precision, and repeated checks. This results in a significant loss of time. This loss of time has an impact on the cost of manufacture of the booster.

Furthermore, in such a device, use is generally made of two fixing screws. The screws are arranged at the furthermost ends of the diamond-shaped flat internal face. The points of contact between the master cylinder and the casing are located only at the fixing screw heads and around the perimeter of the reinforcements. The stresses exerted on the master cylinder are therefore concentrated in these attachment regions. It is necessary for the sheet metal of the cylinder to be fairly thick, and to this thickness is added the thickness of the reinforcements, in order to be able to compensate for this poor distribution of stresses.

Finally, the number of parts needed for attachment (screws, reinforcements, nuts) in part explains the high cost of manufacture of a booster.

SUMMARY OF THE INVENTION

The invention seeks to solve these problems of excessive numbers of parts and poor stress distribution by creating a bearing surface, for contact between the master cylinder and the booster casing, that has a far greater area than it did in the prior art, while at the same time reducing the number of parts needed for this assembly. The checking steps required when attaching the master cylinder to the casing are also reduced.

The principle of the invention consists in extending the bearing surface area for contact between the master cylinder and the cylinder of the booster casing so that practically all of the flat internal face of the cylinder of the casing is subjected to stress. The stresses are thus better distributed. The booster of the invention does not require any additional reinforcing pieces.

In order to arrive at this result, the master cylinder is mounted from inside the booster, a master cylinder flange is situated in the casing of the booster. It is in contact with the flat internal face of the cylinder of the casing. Thus, the master cylinder has a bearing surface for contact with the casing of the booster over the entire area of its flange. The said flange acts as a reinforcement to the flat face of the cylinder.

The subject of the invention is therefore a braking device comprising
- a booster of longitudinal axis (X) formed of a cover and a cylinder defining a sealed pneumatic envelope,
- a central orifice formed on the cylinder of the booster,
- a master cylinder comprising a master cylinder body intended to partially enter the pneumatic envelope, via the central orifice, so that an axis of the master cylinder is coaxial with the axis of the booster, characterized in that the master cylinder is fixed to the cylinder of the booster by plastic deformation of a hollow shaft, the hollow shaft bordering the central orifice and extending towards the outside of the envelope and penetrating at least one orifice made in an exterior surface of the body of the master cylinder.

In a preferred exemplary embodiment of the invention, the master cylinder comprises a flange which extends radially towards the outside of the body of the master cylinder, in a plane orthogonal to the axis of the master cylinder. The cylinder of the booster comprises a flat face which surrounds the central orifice. The flange bears more or less flat against the flat face of the cylinder.

Another subject of the invention is a method of manufacture of a motor vehicle braking device, characterized in that it comprises the following steps:
- a central orifice is formed in a cylinder of a booster, the central orifice being bordered by a hollow shaft;
- a master cylinder is brought inside the booster via an open end of the booster;
- a body of the master cylinder is made to emerge from the cylinder of the booster via the central orifice of the cylinder;
- the hollow shaft is deformed in order to cause at least one notch to enter an orifice machined on the body of the master cylinder, in order to crimp the master cylinder;
- the open end of the booster is closed using a cover.

The invention will be better understood from reading the description which follows and from examining the accompanying figures. These are given merely by way of non-limiting indication of the invention.

BRIEF DESCRIPTION OF THE INVENTION

Figure 2:
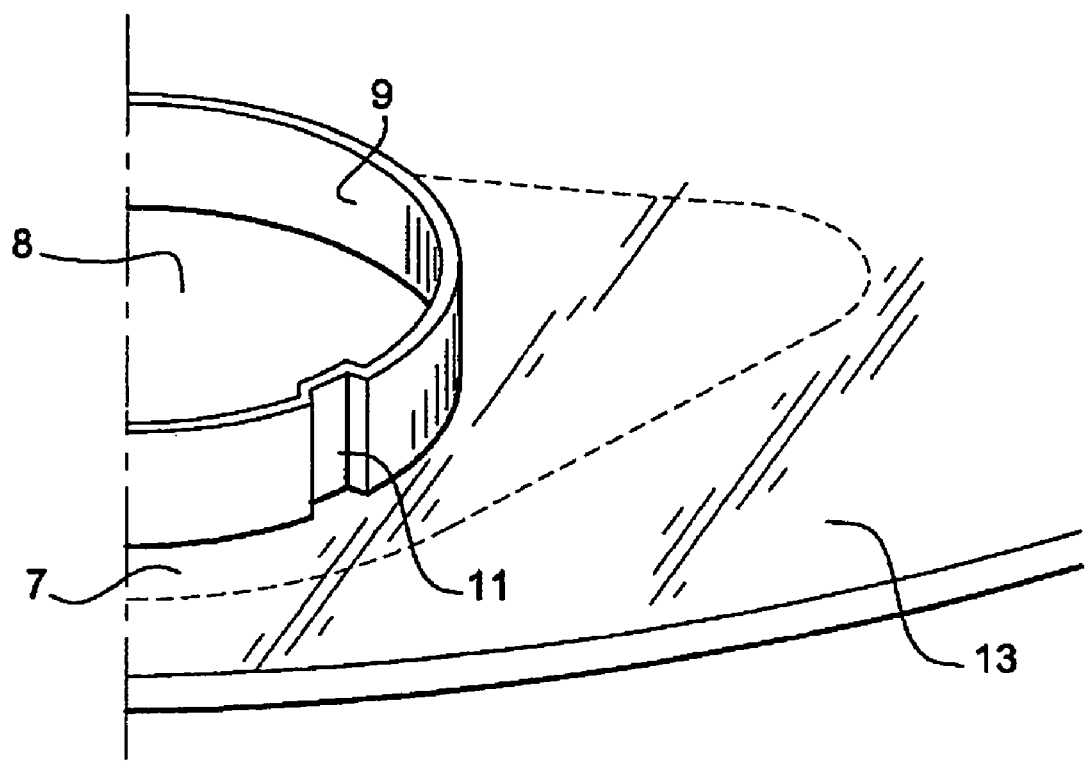
Figure 3:
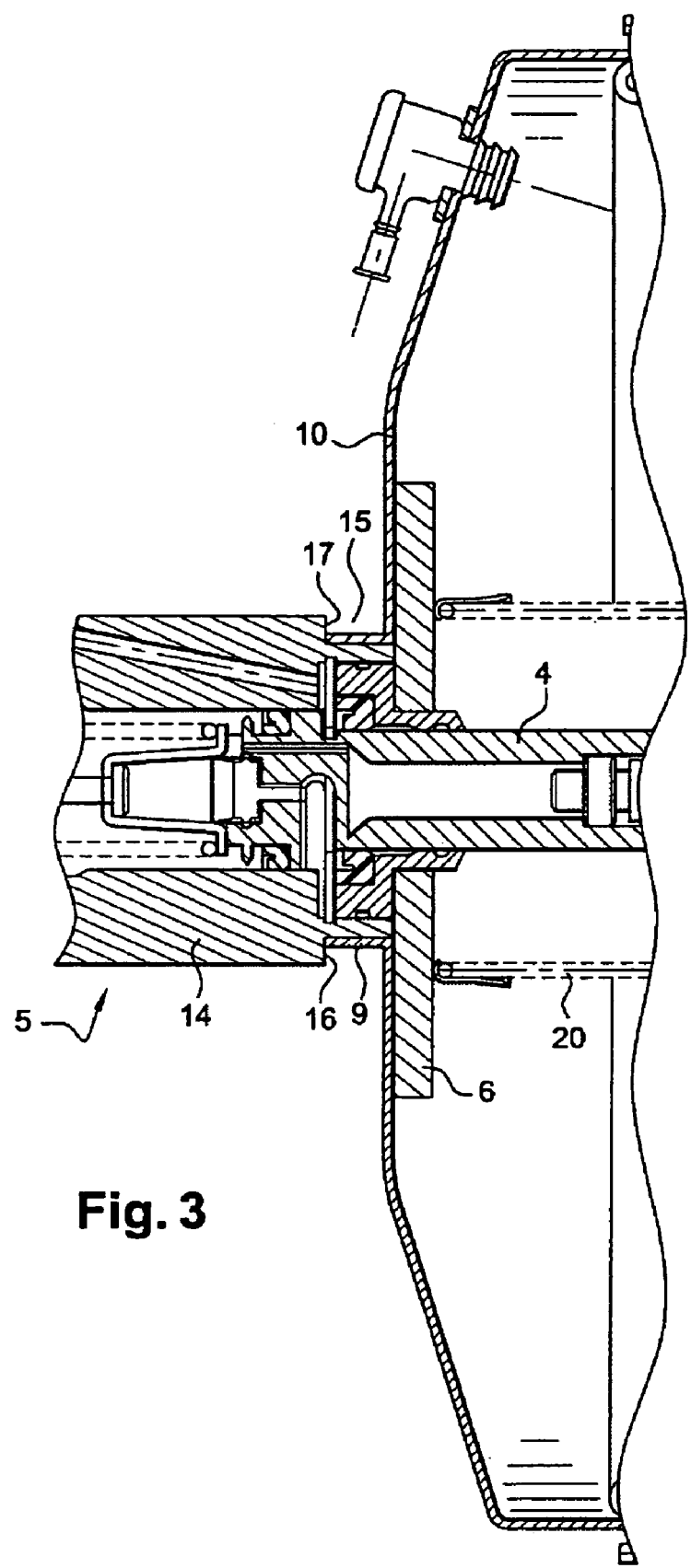

FIG. 1: an overall sectioned view of a braking device according to the invention;

FIG. 2: an enlargement of part of the external face of the wall of the cylinder according to one particular embodiment of the invention; and FIG. 3: an enlargement of part of the cylinder and of the master cylinder, according to one particular embodiment of the invention.

DETAILED DESCRIPTION OF THE INVENTION

FIG. 1 gives a good view of how a master cylinder is mounted from inside a booster as prescribed by the invention. A booster 1 is closed at its ends by a cover 12 and a cylinder 10. The cylinder 10 comprises a flat face 7 and an inclined face 13 (FIG. 2). The inclined face 13 extends from the edge of the flat face 7 to a cylinder edge of the cylinder 10. The booster 1 is equipped with a front chamber 2 pneumatically connected to a rear chamber 3. To denote the interior of the booster, the term generally used is a pneumatic envelope. Housed in the front chamber 2 is a penetration snout 4 of a master cylinder 5. A penetration snout is understood to mean part of the body 14 of the master cylinder 5 housed inside the booster 1. The master cylinder 5 is equipped with a master cylinder flange 6. The flange 6 is mounted on a body 14 of the master cylinder 5 at the location of the penetration snout 4.

Formed on the face 7 of the cylinder 10 is an orifice 8 (FIG. 2) allowing the penetration snout 4 of the master cylinder 5 through. The said orifice 8 is provided with a hollow shaft 9. The hollow shaft 9 may, for example, be obtained by altering the plastic properties of a material of which the cylinder is formed. A circle that forms the orifice 8 is cut out, with a smaller diameter than that of the body 14 of the master cylinder 5, from the sheet metal of the cylinder 10. The sheet metal is then pressed, at the location of this orifice, using a pressing tool of a diameter roughly equal to a diameter of the body 14 of the master cylinder 5. The pressing tool will enlarge the diameter of the orifice 8, creating a hollow shaft 9 around the orifice 8. The hollow shaft 9 is directed towards the outside of the booster 1.

In the present invention, and as is depicted in FIG. 1, it is proposed for the master cylinder 5 to be mounted from inside the booster 1. Attachment of the master cylinder to the booster is performed without using fixing screws. The master cylinder 5 is held on the booster 1 by crimping the body 14 via the hollow shaft 9. The number of parts needed to manufacture a braking device is reduced. There is therefore a saving on time and materials needed to manufacture these additional parts. At the same time, the burdensome steps of checks needed when the cylinder of the booster was fixed to the master cylinder by screws are eliminated. This results in a saving in time and money. The cost of manufacture of a braking device of the invention is therefore lower.

In order to crimp the master cylinder 5 via the hollow shaft 9, the hollow shaft is deformed, for example with cutters (or other tools), so as to cause a notch 11 to penetrate an orifice 15 formed on the body 14 of the master cylinder. As a preference, several orifices 15 are distributed uniformly and angularly around the master cylinder 5 so as to obtain good crimping. It is possible, for example, to crimp the master cylinder 5 by means of four notches 11, approximately 90° apart. The master cylinder 5 is thus crimped by the hollow shaft 9 in the desired position, namely with its penetration snout 4 in the chamber 3, without any possibility of changing.

In another exemplary embodiment of the invention, depicted in FIG. 3, the body 14 of the master cylinder 5 does not have a constant diameter over its entire length. The master cylinder 5 is equipped with a groove 15. The groove 15 is situated between the flange 6 and the body 14 of the master cylinder.

The hollow shaft 9 is deformed in such a way as to cause it to penetrate the groove 15. A rim 16, formed by a step between the groove 15 and the body 14, may act as a bearing surface for a rim 17 of the hollow shaft 9. Thus, if the crimping of the groove 15 via the hollow shaft 9 is insufficient, the play between the master cylinder 5 and the cylinder 10 is limited. What happens is that movement of the master cylinder 5 will be prevented in one direction by the flange 6 in contact with the internal face 7, and in the opposite direction by the rims 16, 17 in contact with the hollow shaft 9.

Because of the crimping, achieved by virtue of the hollow shaft, securing the master cylinder to the booster, the flange on the master cylinder is not compulsory. In the examples depicted, the flange reinforces the connection between the master cylinder and the booster. By creating a bearing surface between the master cylinder and the internal face of the cylinder, the braking device is given greater resistance to the tolerances and tensions to which it is subjected.

Use is preferably made of steel for manufacturing the metal sheet of the booster 1.

In a preferred exemplary embodiment of the invention, the flat internal face 7 of the cylinder 10 has the overall shape of a diamond. The flange 6 of the booster 5 has a bearing surface inscribed within the flat internal face 7 of the cylinder 10. Advantageously, the flange 6 has the overall shape of a diamond, with the same dimensions as the diamond that forms the face 7. This shape of flange 6 in particular makes it possible to avoid problems of installation of the said flange 6 on the face 7 of the cylinder 10. It also gives contact between the flange 6 and the cylinder 10 over the entire flat face 7.

In addition, mounting the master cylinder 5 from inside the booster 1 may allow the thickness of the flange 6 to be decreased by comparison with the thickness of a flange of the prior art, where the master cylinder is mounted from outside the booster. The surface area for contact between the master cylinder 5 and the cylinder 10, mounted according to the invention, is far greater than that which hitherto existed. This is because, in the current devices, the surface area of the contact is essentially located at the fixing screws. These fixing screws secure the booster to a master cylinder flange situated on the outside of the booster. The screws may each be provided with a local reinforcement. The stresses are concentrated in a limited area around each fixing screw in a restricted region of the base 7 and of the flange 6.

In manufacture as recommended by the invention, a surface area for contact between the booster 1 and the master cylinder 5 is present over the entire flat face 7 of the cylinder 10. This yields better distribution of the stresses over the entire face 7 and over the entire flange 6. It is no longer a limited region which is stressed, but the entire surface area of the flat face 7 and the entire surface area of the flange 6. The thickness of the flange 6 can be significantly reduced. For example, in the case of a metal sheet 1.5 mm thick, a flange mounted on the outside of the booster is generally 11 mm thick. The flange according to the invention may itself have a thickness of between 5 and 3.5 mm.

This reduction in the thickness of the flange 6 may also be accompanied by a reduction in the thickness of the sheet metal of the cylinder 10. This is because the thickness of the flange 6, even reduced by several tenths of a millimeter by comparison with a conventional flange, will compensate the thinness of the sheet metal by being inscribed over the entire surface area of the flat internal face 7 of the cylinder 10. For example, it is possible to use a cylinder 10 that has a thickness of 1 mm.

Such a reduction in the amount of material used to manufacture a braking device according to the invention will make a not insignificant contribution to the reduction in its cost of manufacture.

In a particular exemplary embodiment of the invention, it may be possible to fit an O-ring (not depicted) between the body 14 of the master cylinder 5 and the cylinder 10 of the casing 1. This then ensures complete sealing of the inside of the booster 1. The O-ring may, for example, be positioned on an internal face of the hollow shaft 9. As a preference, the O-ring is in contact with the internal face of the hollow shaft 9 and a part of the body of the master cylinder 5 that is situated inside the hollow shaft 9.

FIG. 1 also depicts two return springs 20. Hitherto, it was necessary to provide a region for contact between the spring 20 and the flat internal face 7 of the cylinder when locating the fixing screws. It was necessary to provide a precise location for a fixing screw and a screw reinforcement so that the spring could bear against the reinforcement. The slightest offset of the screw reinforcement prevented the return spring 20 from bearing correctly against the reinforcement. Misalignment of the device then followed, with the risk of preventing the booster from playing its part in boosting the braking.

With the flange 6 mounted from inside the booster, as is described in the invention, there is a possible region for contact between the return spring 20 and the flange 6 that is far larger than it was in the prior art. Thus, there is no need for preoccupation with the arrangement of the flange 6 with respect to the return spring 20. In effect, in all cases, the spring 20 has a bearing region on the flange 6. This results in an additional timesaving at the time of manufacture.

Such a braking device may be obtained in particular by a method of manufacture comprising the following steps:

an orifice is pressed in a wall of the casing 1 of the booster, the said wall closing the casing at one of its ends and being equipped with a flat internal face 7, the pressing being towards the outside of the casing so as to form a hollow shaft 9 around the orifice;

a master cylinder 5 of the booster is brought inside the casing via an open end of the casing;

a body 14 of the master cylinder is made to emerge from the casing of the booster via the orifice in the wall of the casing, the hollow shaft crimping the body of the master cylinder;

a flange 6 of the master cylinder is made to rest on the flat internal face of the wall, the flange being mounted on the body of the master cylinder at the location of a penetration snout 4, and the penetration snout of the master cylinder remaining inside the casing;

the open end of the casing of the booster is closed using a cover 12.

It is possible to provide an additional step, prior to crimping:

a flange 6 of the master cylinder is made to rest on a flat internal face 7 of the cylinder before crimping the master cylinder, the flange being formed on a body 14 of the master cylinder and extending towards the outside of the body of the master cylinder in a plane orthogonal to an axis of the master cylinder.

This method of manufacture allows a significant timesaving in the manufacture of such a device. This is because in the method of manufacture according to the invention, there is no step of positioning screws and/or reinforcements or of tightening screws. Also, there is no longer any need for preoccupation about the positioning of the return springs.

This timesaving has an impact on the total unit cost of the booster. It is lower than that of a booster of the prior art.

What is claimed is:

1. A braking device comprising:
    a booster (1) having a housing with a longitudinal axis (X) formed of a cover (12) and a cylinder (10) defining a sealed pneumatic envelope, a central orifice (8) formed on the cylinder of the booster, a master cylinder (5) having a master cylinder body (14) that partially enters the pneumatic envelope via the central orifice, so that an axis of the master cylinder is coaxial with the axis of the booster, characterized by the master cylinder being fixed to the cylinder of the booster by plastic deformation of a hollow shaft (9), said hollow shaft bordering the central orifice and extending towards the outside of the envelope and penetrating at least one orifice (15) made in an exterior surface of the body of the master cylinder.

2. The Braking device according to claim 1, characterized in that said master cylinder has a flange (6) that extends radially towards the outside of the body of the master cylinder, in a plane orthogonal to the axis of the master cylinder, and in that said cylinder has a flat face (7) that surrounds the central orifice and in that said flange bears more or less flat against the flat face of the cylinder.

3. The Braking device according to claim 2, characterized in that said flat face of the cylinder has the overall shape of a diamond.

4. The Braking device according to claim 2, characterized in that said hollow shaft bordering the central orifice penetrates a groove (15) made in the exterior surface of the body of the master cylinder, a rim (17) of the hollow shaft bearing against a rim (16) of the groove, and the rim of the groove is formed by a step situated between the groove and the body of the master cylinder.

5. The Braking device according to claim 4, characterized in that said flange of the master cylinder has the overall shape of a diamond.

6. A method of manufacturing a braking device, characterized in that it comprises the following steps:
    forming a central orifice (8) in a cylinder (10) of a booster (1), said central orifice being bordered by the hollow shaft (9);
    bringing a master cylinder (5) inside the booster via an open end of the booster;
    emerging a body (14) of the master cylinder from the cylinder of the booster via the central orifice of the cylinder;
    deforming the hollow shaft causing at least one notch (11) to enter an orifice (15) machined on the body of the master cylinder, in order to crimp the master cylinder; and
    closing an open end of the booster using a cover (12).

7. A method of manufacture according to claim 6, characterized in that;
    a flange (6) of the master cylinder is made to rest on a flat internal face (7) of the cylinder before crimping the master cylinder, the flange being formed on a body (14) of the master cylinder and extending towards the outside of the body of the master cylinder in a plane orthogonal to an axis of the master cylinder.

* * * * *